(12) United States Patent
Roberts et al.

(10) Patent No.: US 8,563,122 B1
(45) Date of Patent: Oct. 22, 2013

(54) THERMOPLASTIC ARCHITECTURAL COMPOSITE LAMINATE MATERIALS AND ASSOCIATED METHODS OF MANUFACTURE

(75) Inventors: Richard Roberts, Salt Lake City, UT (US); Frank Roberts, Salt Lake City, UT (US); Matt Wilson, Provo, UT (US); Kris Roberts, Orem, UT (US)

(73) Assignee: Design Imaging, LLC, Orem, UT (US)

( * ) Notice: Subject to any disclaimer, the term of this patent is extended or adjusted under 35 U.S.C. 154(b) by 168 days.

(21) Appl. No.: 13/018,196

(22) Filed: Jan. 31, 2011

Related U.S. Application Data

(63) Continuation-in-part of application No. 11/949,671, filed on Dec. 3, 2007, now abandoned.

(60) Provisional application No. 60/872,147, filed on Dec. 1, 2006.

(51) Int. Cl.
*B32B 7/02* (2006.01)

(52) U.S. Cl.
USPC ........ 428/220; 428/109; 428/158; 428/195.1; 428/203; 428/207; 428/304.4; 428/319.9; 428/332; 428/343; 428/347; 428/908.8

(58) Field of Classification Search
USPC .............. 428/109, 158, 195.1, 203, 207, 220, 428/304.4, 319.9, 332, 343, 347, 354, 908.8
See application file for complete search history.

(56) References Cited

U.S. PATENT DOCUMENTS

| | | | |
|---|---|---|---|
| 4,210,693 A | 7/1980 | Regan et al. | |
| 4,248,816 A | 2/1981 | Sheridan | |
| 4,267,221 A | 5/1981 | Ishikawa | |
| RE31,373 E | 9/1983 | Ungar et al. | |
| 4,581,267 A | 4/1986 | Miller | |
| 4,746,560 A | 5/1988 | Goeden | |
| 5,231,925 A | 8/1993 | Roberts et al. | |
| 5,326,966 A | 7/1994 | Fukuda et al. | |
| 5,395,414 A | 3/1995 | Matasick et al. | |
| 5,403,631 A | 4/1995 | Sato et al. | |
| 5,562,969 A | 10/1996 | Sakamoto et al. | |
| 5,662,977 A | 9/1997 | Spain et al. | |
| RE35,778 E | 4/1998 | Stirling et al. | |
| 5,763,048 A | 6/1998 | Takahashi | |
| 5,919,550 A * | 7/1999 | Koseki et al. | 428/847.4 |
| 6,114,008 A | 9/2000 | Eby et al. | |
| 6,116,181 A | 9/2000 | Kalamaras | |
| 6,194,061 B1 | 2/2001 | Satoh et al. | |
| 6,756,095 B2 | 6/2004 | Sandt et al. | |
| 6,823,794 B2 | 11/2004 | Bosler et al. | |
| 6,964,722 B2 | 11/2005 | Taylor et al. | |
| 7,001,660 B2 | 2/2006 | Garitano | |
| 7,081,300 B2 | 7/2006 | Laurence et al. | |
| 2002/0136862 A1 | 9/2002 | Dong et al. | |
| 2003/0121600 A1 | 7/2003 | Loncar, Jr. et al. | |
| 2004/0043239 A1 * | 3/2004 | Iwasaki et al. | 428/515 |
| 2004/0071978 A1 | 4/2004 | Hallenbeck et al. | |
| 2004/0219339 A1 | 11/2004 | Dempsey et al. | |
| 2005/0079780 A1 | 4/2005 | Rowe et al. | |
| 2007/0036909 A1 | 2/2007 | Luo et al. | |
| 2008/0206505 A1 | 8/2008 | Blackwell et al. | |

FOREIGN PATENT DOCUMENTS

JP 2122995 5/1990
JP 2006/327074 7/2006

OTHER PUBLICATIONS

Related Matter: U.S. Appl. No. 11/949,671; filed Dec. 3, 2007; Kris Roberts.
Sarviel. Construction Estimating Reference Data; 1993; p. 255; Craftsman Book Company.

* cited by examiner

*Primary Examiner* — Maria Veronica Ewald
*Assistant Examiner* — Lawrence Ferguson
(74) *Attorney, Agent, or Firm* — Thorpe North & Western LLP

(57) ABSTRACT

A thermoplastic architectural composite laminate material can include a light transmissive skin, a thermoplastic backing, an adhesive layer and an ink image. The adhesive layer can be between the light transmissive skin and the thermoplastic backing. The ink image can be printed between the light transmissive skin and the thermoplastic backing such that the ink image is visible through the outer surface. The composite laminate materials can be designed with improved temperature fluctuation tolerance, long-term moisture resistance, and tensile and peel strength. Further, the ink image in conjunction with certain adhesives can be highly durable. Such ink images can have a convincing appearance of natural materials such as marble, granite, wood, and the like, including wet-out and depth appearance which can be tailored in appearance and colors.

17 Claims, 1 Drawing Sheet

THERMOPLASTIC ARCHITECTURAL COMPOSITE LAMINATE MATERIALS AND ASSOCIATED METHODS OF MANUFACTURE

RELATED APPLICATIONS

This application is a continuation-in-part of U.S. patent application Ser. No. 11/949,671, filed Dec. 3, 2007 which claims the benefit of U.S. Provisional Patent Application No. 60/872,147, filed Dec. 1, 2006 which are each incorporated herein by reference.

FIELD OF THE INVENTION

The present invention relates generally to architectural laminate materials having an ink layer that is visible through a light transmissive layer and methods of producing such laminates. Accordingly, the present invention involves the fields of chemistry, polymers, polymer processing, printing, and materials science.

BACKGROUND OF THE INVENTION

Architectural materials can be useful for a wide variety of purposes such as surface coverings, e.g. walls, counters, floors, etc. Typical architectural materials can include bathroom and shower panels, wainscoting, and the like. These materials can be formed of plywood, pressboard, vinyl, fiberglass composite, thermoplastic sheet, or other composite materials such as cultured marble and solid surface materials. The various materials may have colorants or colored particles mixed into the material to provide the appearance of marble, granite, or other effects intended to simulate natural materials. Alternatively, thermoplastic sheets may have a pattern painted or printed on the outer surface. Unfortunately, these sheets tend to have an appearance that is two-dimensional, most often clearly appears to be a manufactured material, and the surface patterns are vulnerable to scratching and marring. In addition, available materials and designs are limited due to exposure to wide temperature fluctuations and moisture levels. Adhesives and printing substrates used in laminate material manufacture do not have the moisture resistance sufficient to satisfy the demands of certain architectural applications.

Therefore, materials and methods which provide improved temperature and moisture resistance and are capable of providing more convincing appearance of natural materials continue to be sought.

Figure 1:
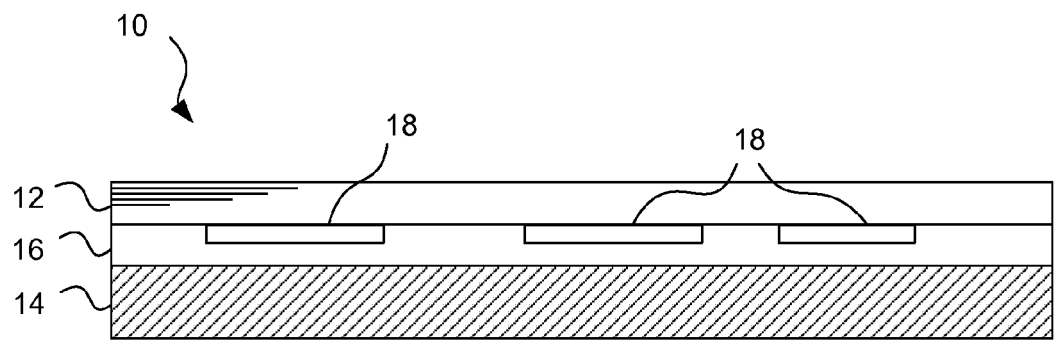
FIG. 1 is a side cross-section view of a composite laminate material having an ink image reverse printed on the light transmissive skin.

These drawings are provided to illustrate various aspects of the invention and are not intended to be limiting of the scope in terms of dimensions, materials, configurations, arrangements or proportions unless otherwise limited by the claims. In particular, relative thicknesses and dimensions are for convenience in illustrating the invention rather than scale.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. For example, "a single layer" would exclude plural layers. Further, reference to "an additive" includes reference to one or more of such components, and reference to "heating" refers to one or more such steps.

As used herein, "thermoplastic" refers to a material which softens or deforms under application of heat and returns to substantially the same molecular structure upon cooling. Such materials are distinct from thermoset materials which do not soften and is irreversibly cured in a solid form, but rather burns upon application of additional heat instead of melting.

As used herein, "architectural" refers to uses which are decorative, aesthetic, or non-load bearing in application. Such architectural materials can include surfacing panels, coverings, and the like.

As used herein, "thermal expansion coefficient mismatch" refers to the percent difference between the thermal expansion coefficients of two materials, e.g. $|(\alpha_2-\alpha_1)|/\alpha_1 \times 100$, where $\alpha$ is the linear thermal expansion coefficient.

As used herein, "wetting" refers to the extent of contact between a fluid, such as an adhesive, and a surface. "Wet-out" refers to the condition of a wetted surface wherein substantially no voids exist between the surface and a fluid, such as an adhesive.

As used herein, "microcellular closed cell structure" refers to a structure of a foamed material having non-interconnected interstitial air voids (cells) with a maximum size of 100 microns.

As used herein, "thermally formed" refers to a process where a thermoplastic material is manipulated with the application of heat to form a desired shape.

As used herein with respect to an identified property or circumstance, "substantially" refers to a degree of deviation that is sufficiently small so as to not measurably detract from the identified property or circumstance. The exact degree of deviation allowable may in some cases depend on the specific context. As used herein, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

B. Thermoplastic Architectural Composite Laminate Material

As illustrated generally in FIG. 1, a thermoplastic architectural composite laminate material 10 can include a light transmissive skin 12, a thermoplastic backing 14, an adhesive layer 16 and an ink image 18. The adhesive layer 16 can be between the light transmissive skin 12 and the thermoplastic backing 14. The ink image 18 can be printed between the light transmissive skin 12 and the thermoplastic backing 14 such that the ink image 18 is visible through an outer surface 20 thereof.

The light transmissive skin can be formed of a material which is useful as an outer layer exposed to use. Typically, the light transmissive skin can be formed of a material which is flexible. Flexibility allows for improved mechanical durability and can increase ease of installation and/or forming the laminate. Further, in many applications water resistance and UV resistance can be important in maintaining long term performance of the laminate material. Thus, in some aspects, the light transmissive skin can include an ultraviolet light absorber. Optionally, an antimicrobial agent can be embedded in the light transmissive skin.

Typically, the light transmissive skin can be substantially transparent. In this way a desired image can be clearly viewed through the skin. However, as a general matter, translucent or even opaque materials can be used.

The light transmissive skin can also be formed of a suitable material, generally a plastic, such as a thermoplastic polymer. As discussed in more detail below, the thermoplastic polymers can be readily shaped to form contours. Further, a thermoplastic polymer skin can also be readily joined with a thermoplastic backing using an appropriate adhesive and the respective inks.

Non-limiting examples of suitable materials for use in the light transmissive skin include polyvinyl chloride, polymethyl methacrylate, polyethylene terephthalate (PET), glycol-modified polyethylene terephthalate (PETG), polyester, acrylic, and the like. Other materials which can also be used to form the skin can include, but are in no way limited to, PET, polyester film with heat fusion backer, polyethylene, polypropylene, polycarbonate, and the like. The light transmissive skin can also comprise a co-extruded cap material or a surface hard coating which increases an abrasion resistance and durability of the skin. The coextruded cap or the surface hard-coating is visually indistinguishable from a base material of the skin and increases scratch and abrasion resistance of the outer surface. In the case of coextrusion, the skin and base materials are different, but are bonded at plastic creation. In the case of a coating, the base is the skin. Coextruded capped materials are commonplace and may include a base polymeric material layer which is heat fused during extrusion to a second cap polymeric material layer. Non-limiting examples of suitable materials include acrylic capped ABS, PLEXIGLAS DR capped acrylic, and the like. Surface hard coatings for thermoplastics may include a heat-curable primerless silicone coating, a UV-cured acylic or urethane coating, and the like. Similarly, the light transmissive skin can include a base polymer layer with a hot melt polymer coating on the inner surface facing the thermoplastic backing. Non-limiting examples of suitable hot melt polymer coating materials include polyethylene, polyvinyl acetate polyamide, hydrocarbon resin, polyamide, polyester, polyolefins, natural asphalt, bitumen, wax, and combination thereof. In one specific aspect, the hot melt polymer coating can comprise polyethylene. In another alternative, the base polymer layer can be an oriented polyester. Additionally, the light transmissive skin inner surface can be further primed using a suitable treatment (i.e. etch, plasma, chemical, etc). Such priming can act to increase adhesion of an adhesive to the inner surface of the light transmissive skin. One commercially available example of a hot melt coated film is a PET film 0.007 inches sold as Trans-Kote® from Transilwrap. In one aspect, the hot melt polymer can be a hot melt adhesive which is a reactive adhesive that after solidifying undergoes further curing by moisture (e.g. reactive urethanes and silicones), or is cured by ultraviolet radiation.

The light transmissive skins can have a thickness which is sufficient to provide the desired visual effect, as well as provide a substantial physical barrier or protective barrier for extended use and durability. As a general guideline the skin can have a thickness from about 0.001 inches (25.4 µm) to about 0.062 inches (1.57 mm), although about 0.025 inches to about 0.125 inches, and thicknesses from 0.03 to about 0.08 inches are useful. Thicknesses below about 0.025 tend to produce unsuitable materials which are susceptible to damage, excessive permeability to water, inks, adhesives, etc., and can result in loss of unique appearance effects discussed in more detail below. Thus, in one aspect, the light transmissive skin has a thickness from 0.03 inches (0.762 mm) to about 0.062 inches (1.57 mm).

A thermoplastic backing can provide mechanical support to the composite laminate material while also providing improved durability and compatibility with adhesives, skins, and inks used in the thermoplastic architectural composite laminate materials. The thermoplastic backing can be a foamed thermoplastic backing or a solid thermoplastic backing. Foamed thermoplastic backings can have reduced density and weight while also increasing adhesion to adjacent layers of the laminate. Frequently, the foamed thermoplastic backing can be foamed as a microcellular closed cell structure. The foamed thermoplastic backing can be formed of materials such as, but not limited to, PETG, PVC, styrenic bead board, PET, PE, and combinations or composites thereof. In one aspect, the foamed thermoplastic backing can consist of or comprise foamed polyvinyl chloride, foamed polystyrene, foamed glycol-modified polyethylene terephthalate, composites of these, and combinations thereof. Currently, PETG and PVC are particularly suitable due to increased UV and moisture resistance. In one detailed aspect, the foamed thermoplastic backing can have a density from about 1 lb/ft$^3$ to about 11 lb/ft$^3$, and in another aspect from about 6 lb/ft$^3$ to about 10 lb/ft$^3$. High density foams can also be suitable for many applications. Such foamed thermoplastic backings can have a density from about 25 lb/ft$^3$ (400 kg/m$^3$) to about 50 lb/ft$^3$ (801 kg/m$^3$), and in one case about 39 lb/ft$^3$ (625 kg/m$^3$).

In an alternative aspect, the thermoplastic backing can be a solid layer. Although other materials may also be suitable, the solid thermoplastic backing can generally comprise or consist essentially of high impact polystyrene, polyvinyl chloride, acrylonitrile butadiene styrene, glycol-modified polyethylene terephthalate, composites thereof, and combinations thereof. Solid backing layers can be effective for some applications. Trade-offs exist as solid backing layers have a higher density than foamed layers such that more raw material is used per unit and results in increased shipping weights.

In many applications such as bathroom panels, temperature fluctuations can become a source of stress and potential delamination of individual layers. Thus, the light transmissive skin and the thermoplastic backing can have linear and volumetric thermal expansion coefficients which are within about 10% of each other, and often within about 5% of each other. Accordingly, in some cases each of the thermoplastic backing and the light transmissive skin can be formed of substantially the same polymer. Not only does this decrease thermal expansion mismatch, but also improves bonding or joining of the materials.

An ink image can be printed between the light transmissive skin and the thermoplastic backing. In one aspect, the ink image can be reverse printed on an inner surface of the light transmissive skin. Alternatively, the ink image can be forward printed on the thermoplastic backing. In another aspect, an ink image can be printed to a thermoplastic carrier film which is embedded between the light transmissive skin and the thermoplastic backing. One non-limiting example of a thermoplastic carrier film is a calendared or cast flexible vinyl. Such carrier films can generally have a thickness from about 0.001 to 0.006 inches, although other thicknesses may be suitable. The carrier films can be transparent, translucent, and/or colored to achieve a desired appearance in a similar manner to the backing and skin layers. In each case, the ink image can be an image which provides a desired aesthetic appearance. For example, the ink image can be a pattern which simulates natural stone such as marble, granite, travertine, or other rock. The ink image can include any number of combinations of colors, veining, particulates, or other features. Further, pearlescent pigments or other light refractive particles can be included in the inks to create effects similar to many natural stones where the minerals have a pearlescent appearance or shimmer.

The ink image can be formed using any suitable printing technique such as digital ink-jet, and the like, although other printing methods may also be suitable. In one aspect, the ink image is a digital print image formed by digital ink-jet printing.

Similarly, accompanying printing devices can be used to accomplish the desired printing. Suitable devices can include, for example, a wide format flatbed printer utilizing UV-cured or solvent-based inks, a roll-to-roll printer, or the like. Commercial examples of such digital printers include Rho 800 by Durst, GS3200 by EFI Vutek, and the like.

In one embodiment a simulated natural stone can be readily formed using digital image processing software and digital printing. However, achieving convincing reproduction of the appearance of natural stone can be difficult. In one aspect, the printing technology employed in U.S. Pat. No. 5,231,925 which is incorporated herein by reference, can be used in gravure, ink-jet or other printing methods.

The versatility and options for the ink image can provide excellent approximation of actual natural stone. For example, the ink image can be a pattern which simulates natural stone such as marble, granite, travertine, or other rock. The ink image can include any number of combinations of colors, veining, particulates, or other features. Further, pearlescent pigments or other light refractive particles can be included in the inks to create effects similar to many natural stones where the minerals have a pearlescent appearance or shimmer. However, additional options which are not naturally available can be readily produced. For example, the ink image can include colors which are chosen to match a customer decor. A particular customer may desire a granite which has a color to match a unique decor. Thus, the simulated natural stone can be printed using colors which are not naturally or readily available. Further, the ink image can also include corporate logos or designs having a raised or sunken appearance. In this way, a natural stone appearance having a logo or other contours printed to provide the appearance of raised or embossed features can be printed into the ink image. Such raised or sunken features can include lettering, designs, or other shapes. Thus, the ink image can form a reproduction of a natural material, a corporate logo, a combination of both or other images.

Suitable inks can generally include digital printing inks such as ultraviolet cured inks, sublimation inks, and solvent-based inks. Non-limiting examples of ultraviolet cured inks include Rho UV by Durst and PressVu UV by EFI Vutek. Non-limiting examples of sublimation inks include SubliM by Sawgrass Technologies and Digistar by Manoukian. Non-limiting examples of solvent-based digital inks include Eco-Solvent Plus by Mutoh and Eco-Sol Max by Roland.

Typically, the ink image can be substantially free of ink migration. Specifically, as the laminate is assembled and during use, the ink desirably does not visibly migrate from initial positions. Unfortunately, many inks respond poorly to extended contact with certain adhesives, skin materials, and backing materials. In one aspect, the interaction of the ink image with the adhesive and laminate layers can result in an ink image which is substantially free of image fracturing. Image fracturing can occur when laminate layers move or otherwise disengage from one another or when adhesive material shrinks. Migration and image fracturing can be minimized or substantially eliminated using combinations of materials described herein. For example, UV cured inks in combination with polyurethane adhesives can bond well with PET and PETG with elimination of migration and image fracturing.

The adhesive layer provides a bond between the light transmissive skin and the thermoplastic backing. Several considerations in choosing an appropriate adhesive can include presence of water during curing and during use, cleaner and mold resistance, tolerance of temperature fluctuations, resistance to discoloration over time, full wet-out to provide optical clarity and the appearance of depth of printed image, resistance to leaching of inks, appearance or color, ultraviolet resistance, flexibility, resistance to wicking of moisture between the skin and backing, and low ink adherence among others. Further, many adhesives coat substrates poorly, e.g. have a low coverage area, leave void pockets and air bubbles, do not fully wet-out the substrate, or may not coat evenly.

Suitable adhesives can generally be substantially colorless, although colored adhesives may be suitable and desirable. For example, substantially colorless adhesives may be suitable if the ink is printed between the adhesive and the backing, such that the image is viewed through the adhesive. Colored adhesive may be suitable if the ink is printed between the skin and the adhesive or if the coloration of the adhesive provides a background color and contributes to the final desired appearance of the composite laminate material. Colorant in the adhesive can also reduce visibility of air pockets entrained in the adhesive layer. In addition, UV degradation can be avoided by including an ultraviolet absorber into the adhesive. Thus, the adhesive can be designed to perform under exposure to UV without substantial degradation of adherence performance over the expected life of the material.

In yet another detailed aspect, the ink image and adhesive layer can be water and mold resistant. Mold resistance can be achieved by including an antibacterial or anti-mold agent in either or both of the ink and adhesive. Water resistance can primarily be a function of the hydrophobicity of the cured materials and porosity of the adhesive layer.

Coverage of the adhesive, or wetting of the substrate, should generally also be relatively high. High coverage, i.e. percent occupation of the coated substrate, can allow for improved uniformity, bond strength, and reduction of voids in the final laminate material. As a general guideline, the adhesive layer can have coverage from about 90% to 100%, and often above 99%. Proper wetting of the light transmissive skin, the thermoplastic backing and the ink image can significantly affect final product appearance and image effects. Specifically, an ink image formed as described herein and an adhesive applied as described herein appear to wet-out the substrate when viewed through the outer surface. This wet-out appearance leaves a desirable look of dimensionality and depth to the printed image. The amount of solvent in an adhesive formulation can also affect coverage as the solvent evaporates and can be taken into account during application. Optionally, the adhesive layer can be flexible once cured or dried. Flexibility can be sufficient to prevent temperature fluctuations and differences in thermal expansions of each layer from shearing or fracturing the ink image or from delaminating the layers. Typically, only a single adhesive layer is oriented between the light transmissive skin and the thermoplastic backing. This may help to reduce or eliminate additional potential points of delamination.

Based on the above guidelines, adhesives can be carefully formulated and/or selected which satisfy such considerations. Examples of suitable adhesives for use in the adhesive layer include water cured reactive polyurethanes such as a hotmelt polymer as disclosed in U.S. Pat. No. 5,965,685 (which is incorporated herein by reference). Suitable adhesives may further include a UV resistant additive, be substantially colorless, and adhere to materials having a surface energy below about 40 dynes/cm. In one specific embodiment, suitable adhesives can include a water-cured and rapid curing aliphatic hot melt adhesive prepared by reacting a hot melt polyurethane prepolymer comprising an unblocked aliphatic polyisocyanate and a polyol with a suitable catalyst. Forbo 2U450 (available from Forbo Bonding Systems) and Forbo 2U495 (which includes an additional pigment) are two particularly useful adhesives which are suitable. Other suitable adhesives can include, but are not limited to, water-based contact adhesives, cyanoacrylates, silicones, acrylics, epoxies, and the like. Generally, UV and air cured adhesives may be avoided due to difficulties associated with curing via UV transmitted through the skin or air between the backing and skin. Currently, water cured adhesives and heat cured adhesives provide particularly effective results. Further, solvent-based adhesives can also be avoided as these tend to blur ink images and fuse the laminate layers so as to often interfere with the desired appearance.

The adhesive layer can be formed by applying an adhesive formulation to one or both of the light transmissive skin and the thermoplastic backing. Application can be accomplished using any suitable technique such as roll coating, spraying, ink-jetting, dipping, or the like. Hotmelt rollcoating can be used to achieve exceptional control of thickness and uniformity. However, the adhesive layer can also be applied effectively using a sprayer.

The adhesive layer can be applied using a roll coater having a doctor roll which rotates at a substantially slower speed as compared to a speed of a coating roll.

This differential speed or rotation causes the adhesive to be smeared somewhat following contact with the substrate, thereby reducing surface thickness variations in the adhesive layer and increasing wet-out. Reducing surface thickness variation in the adhesive layer eliminates potential air voids in the laminate material.

The light transmissive skin and the thermoplastic backing can be heated prior to application of the adhesive layer, so as to elevate a surface energy and promote wetting and adhesion.

The adhesive layer can be further heated immediately following application of the adhesive layer, and prior to joining the light transmissive skin and the thermoplastic backing, so as to decrease a viscosity of the adhesive and level an exposed surface of the adhesive layer to substantially eliminate air pockets which could otherwise become entrapped in the adhesive layer, and to promote substantially full wetting of the light transmissive skin and the thermoplastic backing.

The light transmissive skin and the thermoplastic backing can be joined using the adhesive layer. Although the thermoplastic backing and the light transmissive skin are somewhat flexible, they are also sufficiently rigid in some embodiments that the layer cannot be simply stacked without leaving voids and non-uniformities in the adhesive and ink image. Joining of the skin and backing can be accomplished in a variety of ways including rotary pressing. In one embodiment, the ink image can be forward printed on the thermoplastic backing. Applying the adhesive layer can then include forming the adhesive layer on the ink image in a substantially continuous layer. Alternatively, the ink image can be reverse printed on the inner surface of the light transmissive skin. Joining can include contacting the adhesive layer with the inner surface of the light transmissive skin incrementally, e.g. starting along one edge and progressively pressing while moving across the layers. Progressive pressing can be accomplished by rotary pressing although other methods can be used. Advantageously, roll forming can also be used to achieve a non-planar predetermined surface contour. A suitable nip roller can also be very effective at joining the backing and the skin to form the composite laminate materials. Pressure on the nip roller or rollers can be carefully adjusted to achieve uniform results without bubbling, rippling, or other undesirable effects on the layers.

In one specific example, a composite laminate material can be formed by digitally reverse printing an image on a PETG sheet (e.g. 0.040" thickness). The printed PETG is then laminated to a foamed PVC sheet (e.g. 0.190" thickness) using a polyurethane adhesive. Alternatively, a PET film can be primed to promote adhesion without a hot melt coating. An image can be digitally printed on sublimation paper and roll transferred to the primed surface of the PET film. The printed PET film can then be laminated to a foamed PVC (e.g. 0.190" thickness) using a polyurethane adhesive. In still another alternative, a porous plastic film (e.g. Teslin®) can be used. An image can be directly sublimation printed to the porous film. A hot melt coated PET film (e.g. Trans-kote) can be bonded to the porous film which also activates the sublimation image. The bonded intermediate laminate can then be laminated to a foamed PVC sheet using a polyurethane adhesive where the porous film is oriented between the PVC sheet and the PET film.

Figure 2:
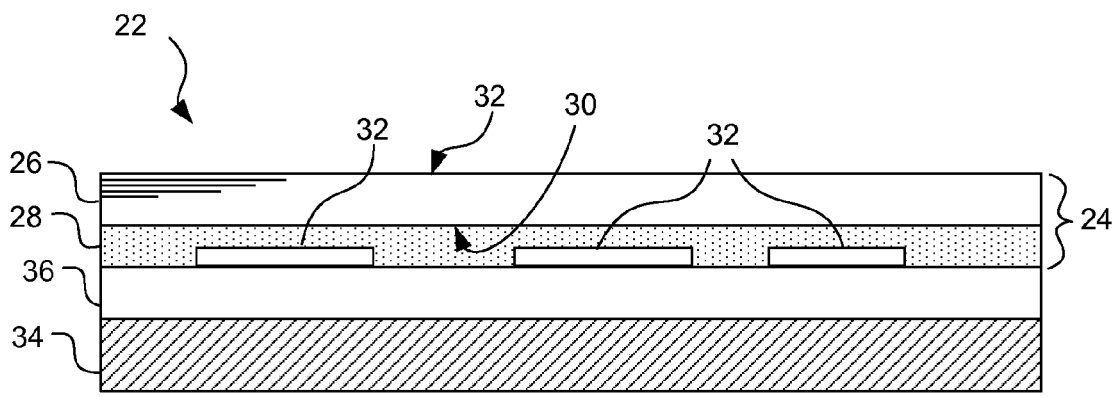
FIG. 2 is a side cross-section view of a composite laminate material having an ink image reverse printed on a light transmissive skin having a hot melt polymer coating.

In another example shown generally in FIG. 2, a thermoplastic architectural composite laminate material 22 can include a light transmissive film skin 24 including a base polymer layer 26 having a hot melt polymer coating 28 on an inner surface 30 opposite an outer surface 32 of the base polymer layer 26. The composite laminate material 22 can also include an ink image 32 printed on the hot melt polymer coating 28 such that the ink image 32 is visible through the outer surface 32 of the base polymer layer 26. A thermoplastic backing layer 34 can be secured to the light transmissive skin 24 using a single adhesive layer 36. The ink image 32 is formed of an ultraviolet cured ink which is cured while the hot melt polymer coating 28 is in a softened state and the laminate material 22 is substantially free of warping or dimensional distortion. Most often, UV ink does not adhere to PET and other materials sufficient to perform in architectural applications. The hot melt coated films can provide a substantial increase in adherence of the UV inks to the film.

The ink image can be formed using a digital printing process with UV curable inks. Typically digital printing involves the use of an ink-jet printer and includes a heating device. In the case of UV curable inks, or when using a hot melt coated skin, the heating device can be integral with the printer or oriented to heat the hot melt coating prior to printing (i.e. adjacent the feed). A heat lamp or resistive heater can be used. Furthermore, the printed UV ink can be cured by exposure to UV radiation. This exposure and curing process can occur while the hot melt coating is in the softened state. Curing after cooling can result in loss of image clarity and increased blurring. Curing the UV curable ink forms the cured image and surprisingly results in a laminate material or film which is substantially free of warping or dimensional distortions. Heat from the UV radiation source can also further enhance bonding of the UV ink with the hot melt coating while in the softened state. As the UV radiation is removed and/or the printed material is removed from the radiation source, the hot melt coating solidifies and hardens to form a complete laminate. Further processing may optionally be performed, although the cured UV ink is now integrally bonded within the hot melt coating layer. Without being bound to a specific theory, it is thought that the cured UV ink is partially intermingled with surrounding hot melt polymer such that the boundary between each is indistinct. This allows the ink to be integrated into the hot melt polymer while contemporaneous timing of the print and cure process can be used to simultaneously minimize loss of clarity.

Regardless of the specific configuration, the thickness of the thermoplastic architectural composite laminate material can be almost any functional thickness, although from about 0.06 to about 0.25 inches is most common. The thermoplastic architectural composite laminate material can have superior properties, among which includes improved tensile strength and moisture resistance (including exposed edges). In one aspect the laminate material can have a flatwise tensile strength of at least 200 psi (13.8 bar) to 1000 psi (68.95 bar), and in some cases from 220 psi (15.2 bar) to 650 psi (44.8 bar) can also be suitable. Flatwise tensile strength of sandwich constructions can be measured by securing each side of a laminate material to cleats, securing the cleats in a one-dimensional displacement device, and measuring the force necessary to delaminate the laminate material (e.g. ASTM C-297 Standard Test Method for Flatwise Tensile Strength of Sandwich Constructions). In another aspect, the composite laminate material can be a wet-wall bathroom panel having a maximum 24 hour water absorbency of 3.0% as per ASTM D570 which also withstands repeated thermal cycling between 50 and 150° F. without delamination.

The thermoplastic architectural composite laminate materials of the present invention are highly useful for a variety of applications. However, in many applications edges of the material may be exposed to view and undesirable conditions. Therefore, in one additional embodiment of the present invention, a finished edge or lip can be formed along the material so as to provide the appearance of a polished or complete surface. The laminate structure of the material can thus be hidden from view and protected from unnecessary exposure.

Finished edges can generally be formed by bending a portion of the laminate material to form an edge which is not coplanar with the bulk or remainder of the laminate material. Corner edges can be formed by bending adjacent edges and bonding open edges together to form a completed corner. Frequently, merely bending the laminate material can result in undesirable stretching of the ink image along the bend and can also result in bulging of material such that a perfect 90° angle is difficult to achieve. Therefore, in accordance with one embodiment of the present invention, an edge can be formed by notching or cutting a back side of the laminate material to form a notch. The laminate material can then be bent along the notch, usually while heating, to form an edge substantially free of stretching artifacts and distortion in the ink image.

The notch can generally be a v-notch which extends partially through the composite laminate material. As the material is bent toward the v-notch, walls of the v-notch draw closer together and eventually contact one another to form an integral edge. Optionally, the edges can be solvent welded during the bending of the laminate material in order to strengthen the edge. In one detailed aspect, the notch does not extend beyond the inner surface of the light transmissive layer. More particularly, it can be preferable to avoid notching through the ink image to avoid creating a visible line along the outer edge. Some slight intrusion along the ink image can be tolerable as long as the final edge does not include a visible line since a small amount of compression of the ink image may occur along the inner portion of the v-notch during bending.

As mentioned previously, the thermoplastic architectural composite laminate materials can be useful in a variety of applications such as bathroom panels for showers, tub areas, ledges, shower floors, and the like. Additionally, the composite laminate materials can be useful in decorative applications such as wainscoting, walls, doors, edging, surrounds, trim, baseboards, and the like. Further, applications such as ceiling panels can also be met due to the relatively light weight of the material compared to natural materials. Currently, bathroom panels are typical applications as the composite materials can be particularly resistant to moisture and temperature fluctuations while also providing the appearance of natural materials. In particular, the thermoplastic architectural composite laminate material can be a bathroom panel having a relatively low water absorbency compared to conventional laminate structures and a peel and tensile strength sufficient to resist delamination when subjected to repeated thermal cycling and moisture exposure.

In addition to the above applications, the thermoplastic architectural composite laminate materials are especially suitable for forming into a non-planar shape. Specifically, various shapes and contours can be introduced into the laminate material using a variety of techniques. In one alternative aspect, the thermoplastic architectural composite laminate material can be vacuum formed to a predetermined surface contour. A finished planar laminate material can be placed over a mold and oriented in a vacuum forming chamber. The assembly can then be subjected to heating and vacuum conditions sufficient to soften the laminate without damaging the ink images, adhesive, or layers. Thus, various shapes can be integrally formed into the material. For example, a soap dish or cavity can be formed into a panel by vacuum forming. In yet another alternative embodiment, the thermoplastic architectural composite laminate material can be formed directly onto a contoured substrate by heat forming. For example, a section of laminate material can be placed against a column and heated using a hand-held heater to form a distinct finish to the column Undesirable surface impressions during such heating can be reduced or avoided by providing a removable backing layer or by other suitable methods. Alternatively, any defects can be resoftened while a refinishing surface, e.g. a flat layer having a smooth or matte surface, can be applied until hardened and then removed.

In yet another detailed aspect, the ink image can be printed to match and complement the predetermined surface contours. Thus, a raised design can be vacuum formed into a panel where raised portion correspond to highlights, shading, lettering, or other printed features.

Thus, there are disclosed improved materials and methods for forming improved architectural laminate materials with improved appearance and performance. The above description and examples are intended only to illustrate certain potential embodiments of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the foregoing description thereof without departing from the substance or scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A thermoplastic architectural composite laminate material, comprising:
   a) a light transmissive skin having an outer surface and an inner surface opposite the outer surface, wherein the light transmissive skin comprises at least one of polyethylene terephthalate and glycol-modified polyethylene terephthalate and is a substantially transparent thermoplastic sheet having a thickness from 0.001 inches (25.4 µm) to about 0.062 inches (1.57 mm);
   b) a foamed polyvinyl chloride thermoplastic backing;
   c) an ink image which is digitally printed between the light transmissive skin and the thermoplastic backing such that the ink image is visible through the outer surface, wherein the ink image is either reverse printed on the inner surface of the light transmissive skin or forward printed on the thermoplastic backing; and
   d) a single adhesive layer between the light transmissive skin and the thermoplastic backing, said single adhesive layer being a hot melt polyurethane, wherein the adhesive layer bonds the light transmissive skin, the ink image and the thermoplastic backing into the thermoplastic architectural composite laminate material having a flatwise tensile strength from about 200 psi (13.8 bar) to about 1000 psi (68.95 bar) as measured by ASTM C-297.

2. The material of claim 1, wherein the light transmissive skin comprises a substantially transparent thermoplastic sheet having a thickness from 0.03 inches (0.762 mm) to about 0.062 inches (1.57 mm).

3. The material of claim 1, wherein the light transmissive skin includes a base polymer layer and a hot melt polymer coating.

4. The material of claim 3, wherein the hot melt polymer coating comprises a polyethylene, a polyvinyl acetate polyamide, a hydrocarbon resin, a polyamide, a polyester, a polyolefins, a natural asphalt, a bitumen, a wax, or combination thereof.

5. The material of claim 4, wherein the hot melt polymer coating comprises polyethylene.

6. The material of claim 3, wherein the base polymer layer is an oriented polyester.

7. The material of claim 1, wherein the foamed thermoplastic backing is foamed as a microcellular closed cell structure.

8. The material of claim 1, wherein the foamed thermoplastic backing has a density from about 25 lb/ft$^3$ (400 kg/m$^3$) to about 50 lb/ft$^3$ (801 kg/m$^3$).

9. The material of claim 1, wherein the adhesive layer comprises a water-cured rapid curing aliphatic hot melt adhesive prepared by reacting a hot melt polyurethane prepolymer comprising an unblocked aliphatic polyisocyanate and a polyol with a catalyst.

10. The material of claim 1, wherein the adhesive layer is substantially colorless, such that the ink image is visible through the adhesive layer and the outer surface of the light transmissive skin.

11. The material of claim 1, wherein the adhesive layer includes a colorant which provides a desired hue to the ink image and also reduces visibility of any air pockets entrained in the adhesive layer.

12. The material of claim 1, wherein the adhesive layer comprises an adhesive which adheres to materials having a surface energy below 40 dynes/cm and achieves 90% to 100% wetting of both the light transmissive skin and the thermoplastic backing.

13. The material of claim 1, wherein the adhesive layer is substantially free of entrapped air and appears to fully wet out the ink image, the light transmissive skin, and the foamed thermoplastic backing such that the laminate material does not appear to be a material comprised of layers when viewed through the outer surface.

14. The material of claim 1, wherein the ink image forms a reproduction of a natural material, a corporate logo, or a combination of both.

15. The material of claim 1, wherein the ink image is formed of an ultraviolet-cured, sublimation ink, or a solvent-based printing ink.

16. The material of claim 1, wherein the thermoplastic architectural composite laminate material is a wet-wall bathroom panel having a maximum 24 hour water absorbency of 3.0% as per ASTM D570, a minimum tensile strength of 200 psi (13.8 bar), and withstands repeated thermal cycling between 10 and 65.6 degrees Celsius without delamination.

17. A method of forming a thermoplastic architectural composite laminate material, comprising the steps of:

a) providing a polyvinyl chloride foamed thermoplastic backing and a light transmissive skin, said light transmissive skin having an inner surface and an outer surface, wherein light transmissive skin comprises at least one of polyethylene terephthalate and glycol-modified polyethylene terephthalate, and is a substantially transparent thermoplastic sheet having a thickness from 0.001 inches (25.4 μm) to about 0.062 inches (1.57 mm);

b) digitally printing an ink on at least one of the thermoplastic backing and the inner surface of the light transmissive skin to form an ink image;

c) applying a hot melt polyurethane adhesive layer to at least one of the thermoplastic backing and the inner surface of the light transmissive skin; and d) joining the light transmissive skin and the thermoplastic backing with said adhesive layer such that the inner surface is adjacent the adhesive layer, and the ink image is visible through the outer surface of the tight transmissive skin, wherein the adhesive layer bonds the light transmissive skin, the ink image and the thermoplastic backing into the thermoplastic architectural composite laminate material having a delamination strength from about 200 psi (13.8 bar) to about 1000 psi (69.0 bar).

* * * * *